United States Patent
VanBlon et al.

(10) Patent No.: US 10,972,605 B2
(45) Date of Patent: Apr. 6, 2021

(54) SIGNATURE BASED COMMUNICATION AUTHENTICATION

(71) Applicant: Lenovo (Singapore) Pte. Ltd., Singapore (SG)

(72) Inventors: Russell Speight VanBlon, Raleigh, NC (US); Robert James Kapinos, Durham, NC (US); Scott Wentao Li, Cary, NC (US); Robert James Norton, Jr., Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/103,399

(22) Filed: Aug. 14, 2018

(65) Prior Publication Data

US 2020/0162610 A1    May 21, 2020

(51) Int. Cl.
| | |
|---|---|
| *H04M 1/56* | (2006.01) |
| *H04M 15/06* | (2006.01) |
| *H04M 3/436* | (2006.01) |
| *H04M 3/42* | (2006.01) |
| *H04W 12/06* | (2021.01) |

(52) U.S. Cl.
CPC ....... *H04M 3/436* (2013.01); *H04M 3/42042* (2013.01); *H04M 3/42382* (2013.01); *H04W 12/06* (2013.01); *H04M 2203/6027* (2013.01)

(58) Field of Classification Search
USPC .................................................. 379/142.05
See application file for complete search history.

(56) References Cited

U.S. PATENT DOCUMENTS

| | | | |
|---|---|---|---|
| 9,264,539 B2 * | 2/2016 | Lin | H04M 3/4365 |
| 9,288,062 B2 * | 3/2016 | Feltham | H04L 63/0414 |
| 9,948,759 B1 * | 4/2018 | Haltom | H04M 3/436 |
| 10,149,156 B1 * | 12/2018 | Tiku | H04L 9/3234 |
| 2008/0181379 A1 * | 7/2008 | Chow | H04L 63/0823 379/142.05 |
| 2011/0143715 A1 * | 6/2011 | Labrador | H04M 3/382 455/411 |
| 2011/0294478 A1 * | 12/2011 | Trivi | H04M 3/436 455/415 |
| 2017/0054708 A1 * | 2/2017 | Zaw | H04L 63/0442 |
| 2018/0048759 A1 * | 2/2018 | Sharpe | H04M 15/56 |
| 2018/0152307 A1 * | 5/2018 | Grover | H04L 63/12 |
| 2018/0294959 A1 * | 10/2018 | Traynor | H04L 9/0844 |
| 2019/0116173 A1 * | 4/2019 | Robison | H04L 63/0823 |

* cited by examiner

*Primary Examiner* — Quoc D Tran
(74) *Attorney, Agent, or Firm* — Ference & Associates LLC

(57) ABSTRACT

One embodiment provides a method, including: detecting, using an application of an information handling device, an incoming call from another device, the incoming call being associated with an identifying message signed with a user-specific signature; determining, using a processor, whether the user-specific signature is associated with a valid signature; and accepting, responsive to determining that the user-specific signature is associated with a valid signature, the call. Other aspects are described and claimed.

14 Claims, 3 Drawing Sheets

SIGNATURE BASED COMMUNICATION AUTHENTICATION

BACKGROUND

Individuals often become frustrated when they receive "spam" telephone calls from scammers, telemarketers, prankers, etc. One type of spamming method that has become increasingly popular over the past decade is caller ID spoofing ("spoofing"). Spoofing is the practice of causing the telephone network to indicate to a recipient of a call that the originator of the call is a station other than the true originating station. Such a tactic may trick the recipient into answering the phone.

BRIEF SUMMARY

In summary, one aspect provides a method, comprising: detecting, using an application of an information handling device, an incoming call from another device, the incoming call being associated with an identifying message signed with a user-specific signature; determining, using a processor, whether the user-specific signature is associated with a valid signature; and accepting, responsive to determining that the user-specific signature is associated with a valid signature, the call.

Another aspect provides an information handling device, comprising: a processor; a memory device that stores instructions executable by the processor to: detect, using an application of the information handling device, an incoming call from another device, the incoming call being associated with an identifying message signed with a user-specific signature; determine whether the user-specific signature is associated with a valid signature; and accept, responsive to determining that the user-specific signature is associated with a valid signature, the call.

A further aspect provides a method, comprising: detecting a transmitted call directed to a device, the transmitted call being associated with an identifying message signed with a user-specific signature; determining, using a processor, whether the user-specific signature is associated with a valid signature; and transmitting, responsive to determining that the user-specific signature is associated with a valid signature, the call to the device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
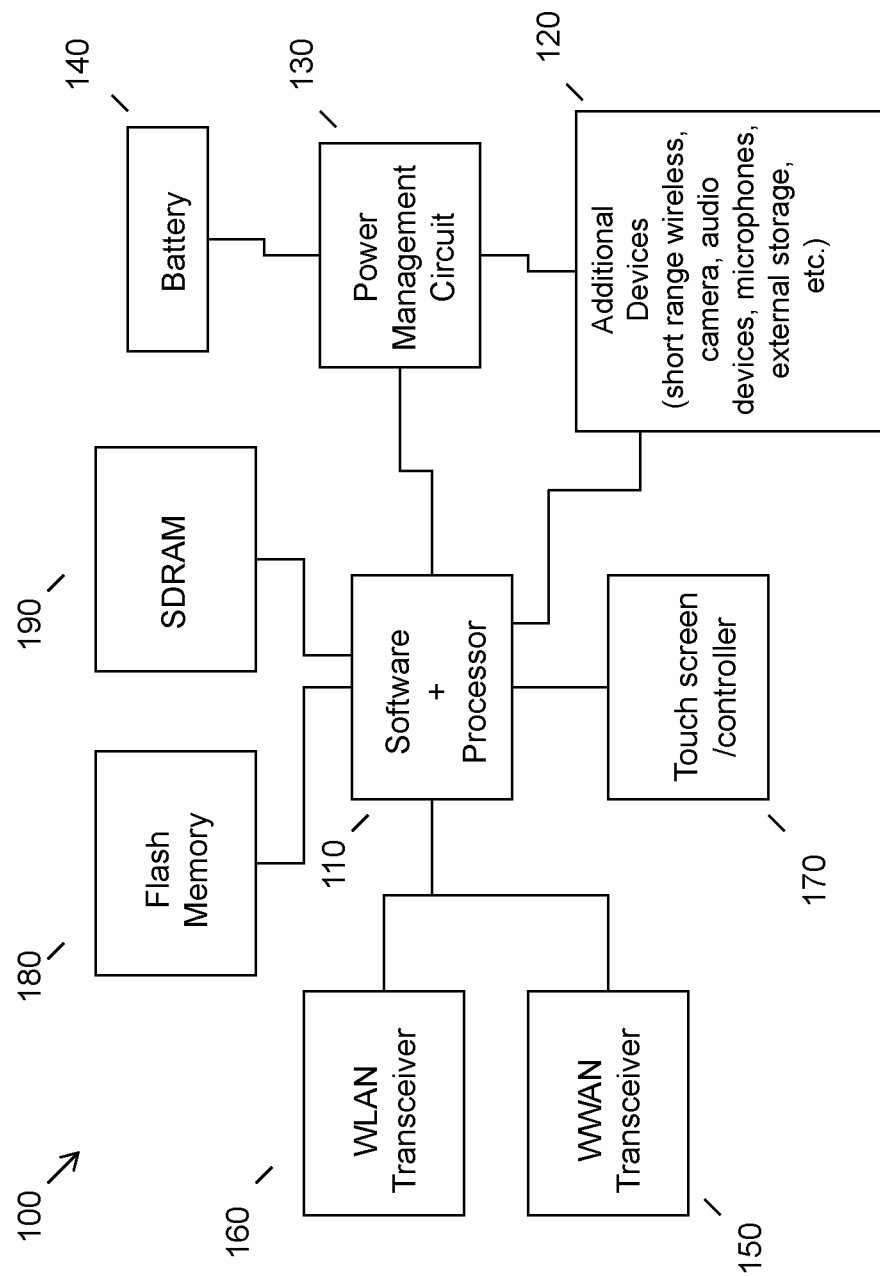
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Caller ID spoofing ("spoofing") is technology that allows a caller to alter the information forwarded to the caller ID of a recipient's device in order to hide the caller's true identity. In simpler terms, spoofing allows a caller to display contact information (e.g., a phone number, identity name, etc.) on a recipient's device different than the contact information actually used to make the communication. As a result of this, spoofing has become a tactic that is often used by scammers, prankers, telemarketers, etc. to trick an individual into accepting a call or opening a message. For example, a type of spoofing known as "neighbor spoofing" works by tricking call recipients into thinking they are receiving a legitimate phone call by showing the recipient a caller ID that matches or is close to the recipient phone number's numbering plan area ("NPA-NXX"). By matching their NPA-NXX closely to the recipient's, a caller may trick a recipient into thinking the call is coming from a legitimate phone number because it looks as though the call is coming from a phone number in the recipient's area code.

Many applications currently exist that collect databases of known scammers, telemarketers, prank callers, etc. If a caller's number is determined to be associated with a number in one of these databases, a recipient may be alerted. However, spoofing inherently overcomes the protections offered by these applications by choosing numbers that are legitimate and are not present on this list. Additionally, telephone companies have no interest in preventing spoofing because telemarketers, spammers, etc. provide a substantial revenue stream. As such, a need exists for a method that may alert individuals to spoofed numbers and/or prevent calls associated with spoofed numbers from being passed on to a recipient.

Accordingly, an embodiment provides a method for determining whether an incoming call is associated with a known, sincere caller or is associated with a potential scammer. In an embodiment, an incoming call may be detected. The call may be detected using a user's device (e.g., an application on the device associated with call authorization, etc.), another device associated with a call authorization service provider, a device connected to a landline phone, and the like. The call may be associated with an identifying message signed with a user-specific signature (e.g., a public key specifically assigned to a user's phone number, etc.). In an embodiment, the identifying message may be transmitted concurrently with the call through a second channel (e.g., using SMS, cellular data, WiFi, another transmission method, etc.). An embodiment may then determine whether the user-specific signature is associated with a valid signature and thereafter accept, or transmit, the call responsive to determining a positive match. Responsive to determining that the user-specific signature is not associated with a valid signature, an embodiment may ignore or reject the call. Such techniques may prevent bad actors from spoofing their caller ID.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes a touch screen 170 for data input and display/rendering. System 100 also typically includes various memory devices, for example flash memory 180 and SDRAM 190.

Figure 2:
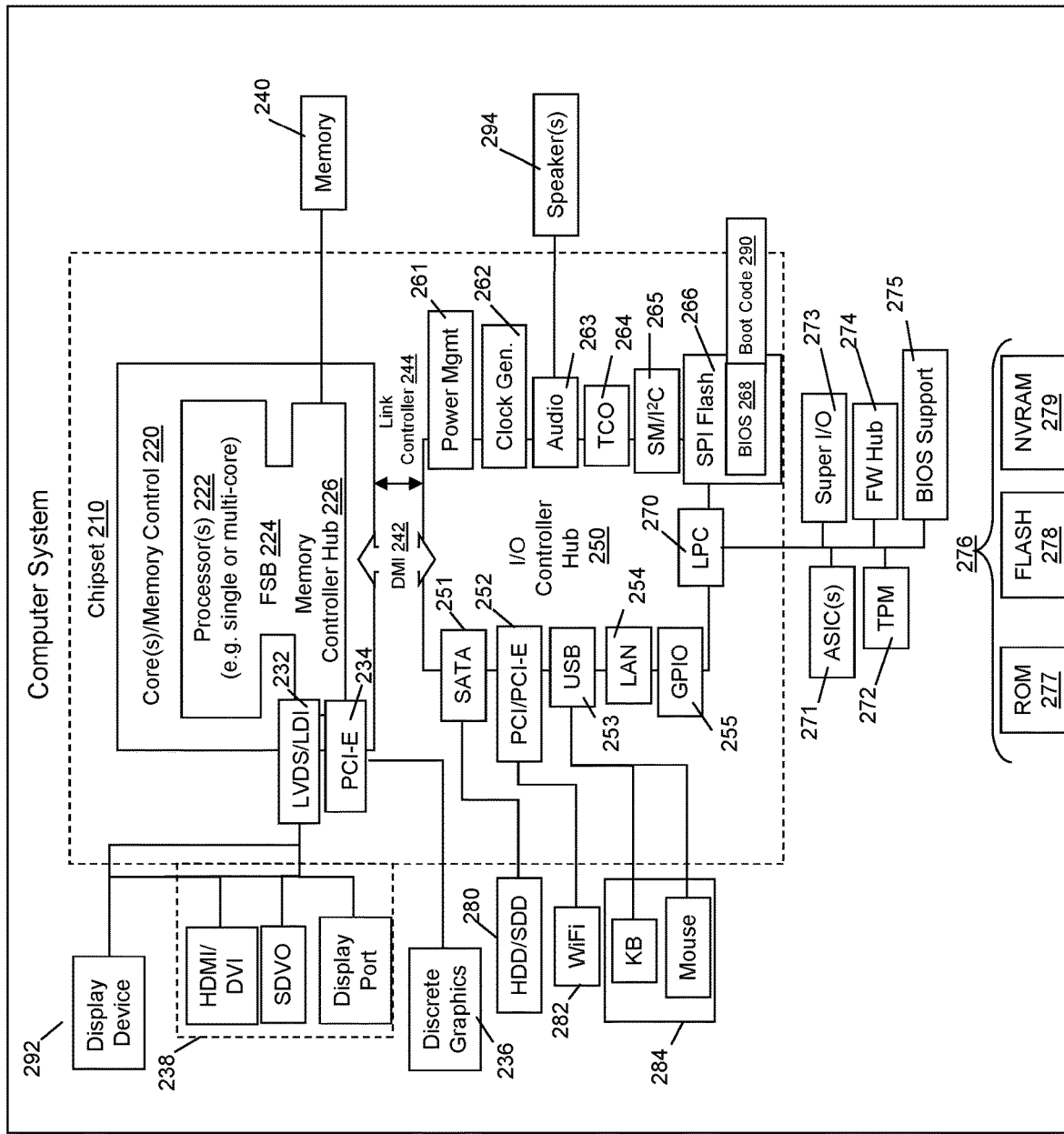
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, smart speakers, smart appliances, personal computer devices generally, and/or electronic devices which may include digital assistants that may be capable of accepting and transmitting telephonic communications with other devices. For example, the circuitry outlined in FIG. 1 may be implemented in a tablet or smart phone embodiment, whereas the circuitry outlined in FIG. 2 may be implemented in a personal computer embodiment.

Figure 3:
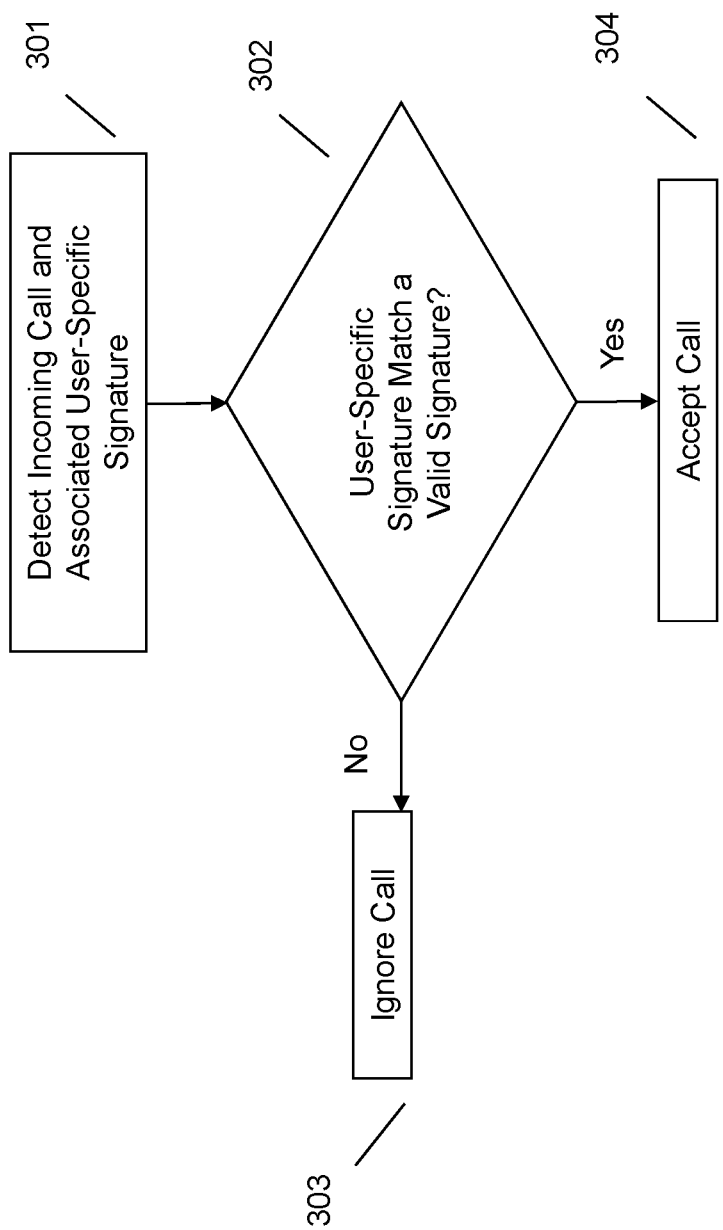
FIG. 3 illustrates an example method of authorizing an incoming call using a cryptographic signature.

Referring now to FIG. 3, an embodiment may determine whether an incoming call is associated with an authorized caller or a potential bad actor. At 301, an embodiment may detect an incoming call. The call may be detected using an application resident on a user's device, using another device associated with a call authorization service provider, a combination thereof, and the like. For example, an application may be installed on a user's device that enables the transmission and receipt of telephonic calls. The application may be configured to receive telephonic calls from other devices using the same application or telephonic calls from any device, regardless of their affiliation with the application. As another example, the detection of the call may be conducted away from the user's device, for example, at a service provider. That is, a service provider may receive an indication that a call is being transmitted from one device to another. In yet another example, a device may be attached to a user's home phone landline to detect incoming calls.

In an embodiment, each user of the application and/or subscriber to a caller network may be assigned a user-specific certificate. The user-specific certificate may be a public/private key pair that may be associated with an individual phone number. In an embodiment, the certificate authority (i.e., the issuer of the certificates) and the service provider may be one and the same. If a user changes numbers or ports a number, the certificate authority may transfer a certificate, or re-issue a new certificate, assigned to the new number. If the new number already has a known certificate, the certificate authority may send a message to confirm ownership.

In an embodiment, a call may be associated with an identifying message. The identifying message may provide an indication of the caller's identity and may comprise one or more of: a caller's number, a recipient's number, a time of transmission of the call, a nonce, and the like. Additionally, in an embodiment the identifying message may be signed with the user's certificate. That is, an encrypted form of a user's private key may be used to sign the identifying message.

In an embodiment, the identifying message may be transmitted substantially concurrently with the call. For example, when a call from one device to another is initiated, the identifying message may be sent to the recipient through a second channel. The second channel may use any convenient transport targetable to the phone such as, for example, Short Message Service (SMS), cellular data, Wi-Fi, etc. In an embodiment, the signing and sending of the message may occur in the application used to make the call. In the case of SMS, the SMS app may sign data that is occurring over the call network. Such a method may also work for landlines if the landline phone is Voice over Internet Protocol (VOIP) based or is an Internet of Things (IOT) Plain Old Telephone Service (POTS) device. In another embodiment, a device may be plugged into the home phone line to detect outgoing calls and generate the message and signature blocks from user programmed parameters. In yet another embodiment, an unsigned message may first be transmitted by a device concurrently with a call and may thereafter be signed at some intermediary point (e.g., by the service provider, etc.) prior to the recipient receiving the message.

At 302, an embodiment may determine whether the user-specific signature is associated with a valid signature. An embodiment may conduct the determination at the recipient's device (e.g., on the application, etc.), at the service provider, on a device attached to a landline, etc. In an embodiment, the determination may be conducted prior to a recipient receiving an indication of the call. For example, the determination may be conducted before a phone of a recipient ever rings.

In an embodiment, the determination may be conducted by comparing the certificate in the user-specific signature to a list comprising a plurality of associations between certificates and the corresponding phone numbers they were assigned to. An embodiment may then identify whether the detected certificate and caller phone number match one of the certificate-phone number associations contained in the list. As a practical example implementation of the foregoing embodiments, a call recipient may see a call coming in and before the phone rings a matching message is checked in parallel for a valid signature using the caller's public key. Because the caller's public key is tied to the owner's phone number it can be looked up using a public database. If the signature is valid, the phone rings. If the signature is invalid, the call recipient could choose to auto-reject the call, request the caller provide a signature via automated voice message, send to voicemail, etc. In an embodiment, the message may contain other inherent protections that protect against spoofing. For example, if a bad actor somehow obtained a validly signed messaged (e.g., transmitted between two other users, etc.), that message may be essentially useless because the message may only be valid for the particular time the message was sent and between the users it was transmitted between.

In an embodiment, if a call is detected that does not comprise a certificate, an embodiment may refer to a list of user settings to identify how to handle the call. For example, a user may choose to have all received calls that do not have an assigned certificate be automatically rejected or ignored. In such a situation, all calls without a detected certificate of any kind may be immediately ignored without being forwarded to the user. In another embodiment, calls without a detected certificate may be forwarded to the user with an indication that the incoming call does not have an associated with signature. In yet another embodiment, a system may ignore the call and automatically provide a kickback message to the caller requesting them to provide a certificate or other identifying information with their next call or to subscribe to an authorized certificate assigning service to obtain a certificate.

Responsive to determining, at 302, that the user-specific signature is not associated with a valid signature, an embodiment may, at 303, ignore or reject the call. In an embodiment, the call may be ignored without providing an indication of the call to a recipient. In another embodiment, a notification may be sent to the recipient that a call was rejected. The notification may comprise information regarding why the call was rejected (e.g., signature did not match a corresponding caller phone number, etc.). In yet another embodiment, the call may be forwarded to the recipient but with a substantially concurrent notification that an aspect of the message could not be verified (e.g., signature did not match a corresponding caller phone number, etc.). In yet a further embodiment still, an embodiment may automatically provide a kickback message to the caller notifying them why their call could not be completed and request them to sign their message with a valid signature. In yet a further embodiment still, an embodiment may report the invalid message to a certificate authority. The certificate authority may then be motivated to revoke the invalid user's certificate, which may end their ability to make "signed" calls. Such a technique could work in unison with existing "spammer databases" to further reduce robo-calls.

Responsive to determining, at 302, that the user-specific signature is associated with a valid signature, an embodiment may accept, at 304, the call. If the determination occurs on the device (e.g., on an application installed on the device, etc.), an embodiment may then provide an indication of the call to the user (e.g., provide audible output, vibration output, visual output, etc.). If the determination occurs at a service provider, the authenticated call may thereafter be transmitted to the user device after which the device may then provide an indication of the call to the user.

The various embodiments described herein thus represent a technical improvement to conventional methods of preventing caller ID spoofing. Using the techniques described herein, an embodiment may detect both: an incoming call and an identifying message transmitted concurrently with the incoming call. The identifying message may be signed with a user-specific signature that may be checked against a database that contains associations between user-specific signatures and corresponding phone numbers. Responsive to determining that the user-specific signature in the message and the caller's phone number match an association in the database, an embodiment may accept, or transmit, the call. Otherwise, an embodiment may ignore the call and/or perform a variety of other actions. Such techniques may prevent instances of caller ID spoofing and also decrease, or eliminate, the occurrence of spam phone calls.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    detecting, using an application of an information handling device and over a first communication channel, an incoming call from another device;
    identifying, as being associated with the incoming call and over a second communication channel, an identifying message signed with a user-specific signature, wherein the user-specific signature is encrypted with a private key associated with the another device;
    determining, using a processor, whether the user-specific signature is associated with a valid signature, wherein the determining comprises:
        determining whether a public key exists that is associated with the another device; and
        identifying, responsive to determining that the public key exists, whether the public key is a pair to the private key; and
    rejecting, responsive to determining that the user-specific signature is not associated with the valid signature, the incoming call.

2. The method of claim 1, wherein each of the user-specific signatures is associated with an individual phone number.

3. The method of claim 1, wherein the determining comprises:
    comparing the user-specific signature to a list comprising a plurality of associations between user-specific signatures and phone numbers; and
    identifying whether the user-specific signature and phone number associated with the incoming call match one of the plurality of associations in the list.

4. The method of claim 1, wherein the identifying message comprises one or more of: a caller's number, a recipient's number, a current time, and a nonce.

5. The method of claim 1, wherein the identifying message comprises an SMS message transmitted substantially in time with the incoming call.

6. The method of claim 1, wherein the rejecting comprises rejecting the incoming call prior to providing an indication of the incoming call to a user of the information handling device.

7. The method of claim 1, further comprising requesting a caller to provide a valid signature via an automated response.

8. An information handling device, comprising:
a processor;
a memory device that stores instructions executable by the processor to:
detect, using an application of the information handling device and over a first communication channel, an incoming call from another device;
identify, as being associated with the incoming call and over a second communication channel, an identifying message signed with a user-specific signature, wherein the user-specific signature is encrypted with a private key associated with the another device;
determine whether the user-specific signature is associated with a valid signature wherein the instructions executable by the processor to determine comprise instructions executable by the processor to:
determine whether a public key exists that is associated with the another device; and
identify, responsive to determining that the public key exists, whether the public key is a pair to the private key; and
reject responsive to determining that the user-specific signature is not associated with the valid signature, the incoming call.

9. The information handling device of claim 8, wherein each of the user-specific signatures is associated with an individual phone number.

10. The information handling device of claim 8, wherein the instructions executable by the processor to determine comprise instructions executable by the processor to:
compare the user-specific signature to a list comprising a plurality of associations between user-specific signatures and phone numbers; and
identify whether the user-specific signature and phone number associated with the incoming call match one of the plurality of associations in the list.

11. The information handling device of claim 8, wherein the identifying message comprises one or more of: a caller's number, a recipient's number, a current time, and a nonce.

12. The information handling device of claim 8, wherein the identifying message comprises an SMS message transmitted substantially in time with the incoming call.

13. The information handling device of claim 9, wherein the instructions executable by the processor to reject comprise instructions executable by the processor to reject the incoming call prior to providing an indication of the incoming call to a user of the information handling device.

14. The information handling device of claim 9, wherein the instructions are further executable by the processor to request a caller to provide a valid signature via an automated response.

* * * * *